United States Patent [19]
Sourour et al.

[11] Patent Number: 6,147,982
[45] Date of Patent: Nov. 14, 2000

[54] SYSTEM AND METHOD FOR SYNCHRONIZING ACQUISITION FOR A CODE MODULATED COMMUNICATION SYSTEM

[75] Inventors: Essam Sourour, Raleigh; Gregory E. Bottomley; Rajaram Ramesh, both of Cary, all of N.C.

[73] Assignee: Ericsson, Inc., Research Triangle Park, N.C.

[21] Appl. No.: 09/001,029

[22] Filed: Dec. 30, 1997

[51] Int. Cl.[7] .............................. H04J 3/06; H04B 7/212

[52] U.S. Cl. .................. 370/324; 370/350; 370/515; 375/142

[58] Field of Search .................................. 375/208, 367, 375/366, 330, 206, 340, 200, 142, 145; 370/512, 320, 324, 335, 342, 509, 510, 514, 515, 516, 350

[56] References Cited

U.S. PATENT DOCUMENTS

| | | | |
|---|---|---|---|
| 5,588,027 | 12/1996 | Lim | 375/330 |
| 5,768,306 | 6/1998 | Sawahashi et al. | |
| 5,883,929 | 3/1999 | Wang et al. | 375/367 |
| 5,960,048 | 9/1999 | Haartsen | 375/340 |
| 5,987,059 | 11/1999 | Harrison et al. | 375/208 |

*Primary Examiner*—Chau Nguyen
*Assistant Examiner*—Chiho Andrew Lee

[57] ABSTRACT

A system and method for a synchronizing acquisition of a transmitted signal with a local code in a code modulated communication system. The local code is comprised of a replica of the transmitted code. Samples of the transmitted code are correlated with the local code and resulting periodic output samples having indexes are compared with a threshold. Selected indexes of the samples exceeding the threshold are stored and verified for synchronization. Stored correlation indexes which exceed the threshold are combined, and a responder achieves synchronization between transmitted signal and the local code.

29 Claims, 6 Drawing Sheets

SYSTEM AND METHOD FOR SYNCHRONIZING ACQUISITION FOR A CODE MODULATED COMMUNICATION SYSTEM

BACKGROUND OF THE INVENTION

The present invention relates to a code modulated communication system, and more particularly to a system and method for acquiring synchronization in such a code modulated communication system.

In a code modulated communication system such as a direct sequence spread spectrum (SS) system, the transmitter multiplies the data by a periodic pseudo-random (PN) code with a chip rate which is much higher than the data rate. This process spreads the frequency bandwidth of the transmitted signal. PN code bits are called chips to differentiate them from data bits. The transmitted signal is received at a receiver, and the transmitted signal is despread at the receiver to its original bandwidth using a replica of the spreading code used at the transmitter. Before being able to despread the signal and extract the data, the receiver must synchronize its locally generated PN code with the PN code of the received signal. To facilitate synchronization, the transmitter typically also transmits the PN code, or a related PN code, alone, without data modulation. The receiver synchronizes its local PN code with the transmitted PN code prior to data detection.

During SS PN acquisition the received and local codes are synchronized to within a coarse accuracy of plus or minus one half of the duration of one PN chip. It is also known to use tracking to provide fine synchronization.

There exists a number of techniques for SS PN code acquisition. For further information regarding SS PN code acquisition, the reader is referred to chapter one of *Spread Spectrum Communications, Vol. III.*, by M. K. Simon, J. K. Omura, R. A. Scholtz and B. K. Levitt, Rockville, Md.: Computer Science Press, 1985, the disclosure of which is hereby incorporated by reference.

In existing acquisition applications, a threshold is set at a level to prevent noise samples from causing false indication. In a search mode, samples of received signals are correlated with a local code which is a replica of the code of the transmitted signal using an I-Q square law envelope detector (SLED) having a correlator in which the local code is loaded. Correlation values are outputted from the SLED, and when a correlation value exceeds a pre-selected threshold, the value and its corresponding index are recorded. If a tested correlation value does not exceed the threshold, the next index is tested. When a correlation value exceeds the threshold, a verification mode is performed to determine if the corresponding index represents the existence of synchronization. At a low signal to noise ratio, or during a channel fading period, the sample corresponding to the correct match will not necessarily exceed the threshold. Consequently, in some cases multiple code periods have to be tested in the search mode before entering the verification mode. Disadvantageously, this results in delay in acquisition, verification and decoded data reception.

Prior to each new search period, all information concerning previous indexes from previous searches is cleared from memory.

With known verification techniques, only one index i is abstracted during the search mode and tested during the verification mode. Disadvantageously, restricting verification to only one candidate index results in a high probability of missing the index corresponding to synchronization and resultant need for time consuming repetition of the search.

Accordingly a need exists for a code modulated communication system with an improved and faster synchronizing acquisition system and method which utilizes the history of comparing samples and associated indexes of received transmitted signals with a local code, especially when operating in a fading channel and/or low signal-to-noise ratio (SNR) environment.

SUMMARY OF THE INVENTION

This need is met by the system and method for synchronizing acquisition of a transmitted signal with a local code in a code modulated communication system in accordance with the present invention. A correlator is provided for producing a correlation value and its corresponding index representative of the extent of correlation during each one of a plurality of search periods. The correlation values and the corresponding indexes produced during each of the plurality of successive search periods are stored in a first memory. The correlation values which exceed a preselected threshold are combined, and a responder for responding to the combined correlation values is provided to achieve synchronization between the transmitted signal and the local code.

Another aspect of the invention provides a system and method of acquisition for acquiring synchronizing of a received transmitted signal with a local signal in a modulated communication system, providing for correlating first outputted samples of the received signal and the local signal and establishing a first search threshold. The correlated first outputted samples are compared to the first search threshold and a selected number of samples first correlated that exceed the first threshold are stored in a first memory. A verification threshold is established. The samples stored in the first memory are recorrelated and samples in the first memory are compared to the verification threshold. Synchronization is established for the recorrelated stored samples corresponding to the first outputted samples which exceed the verification threshold a selected number of times.

In yet another aspect of the invention, a second search threshold is established and first outputted samples are compared to the second search threshold, if no first outputted samples exceed the first search threshold. First outputted samples greater than the second search thresholds are stored in a second memory. Average values of selected first outputted samples that exceed a third search threshold are subject to verification for synchronization.

These and other features and advantages of the present invention will become apparent from the following detailed description, the accompanying drawings, and the appended claims.

DETAILED DESCRIPTION

Figures 1, 3:
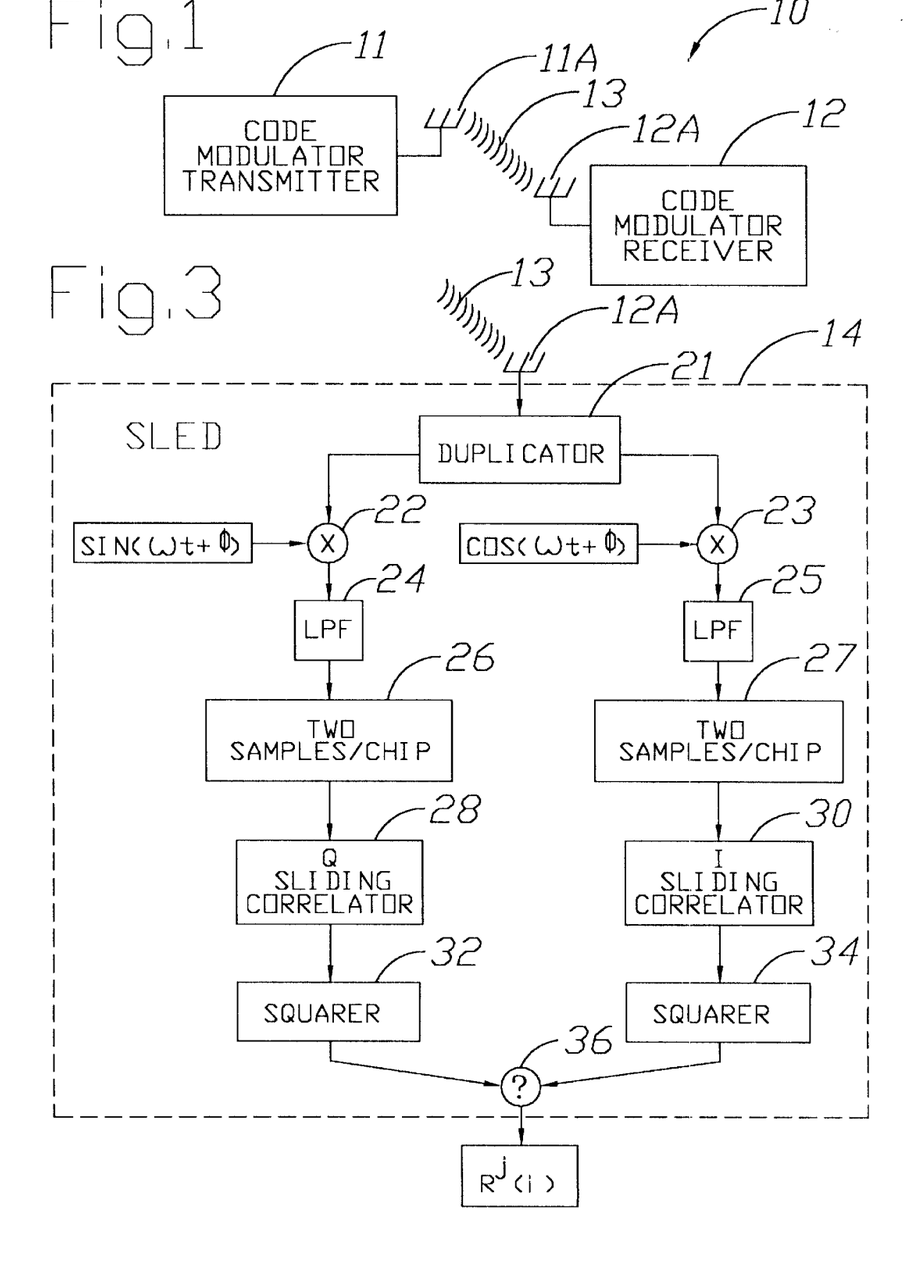
FIG. 1 is a functional block diagram of a code modulated communication system constructed in accordance with the invention.
FIG. 3 is a functional block diagram of the SLED of the code modulated communication system shown in FIG. 1.

A code modulating communication system 10 constructed in accordance with the invention is shown in FIG. 1. The system 10 includes a code modulated transmitter 11 having an antenna 11A, and a code modulated receiver 12 having an antenna 12A. A transmitted signal 13 having a PN spreading code is transmitted at antenna 11A and is received by the code modulated receiver 12 at antenna 12A.

Figure 2:
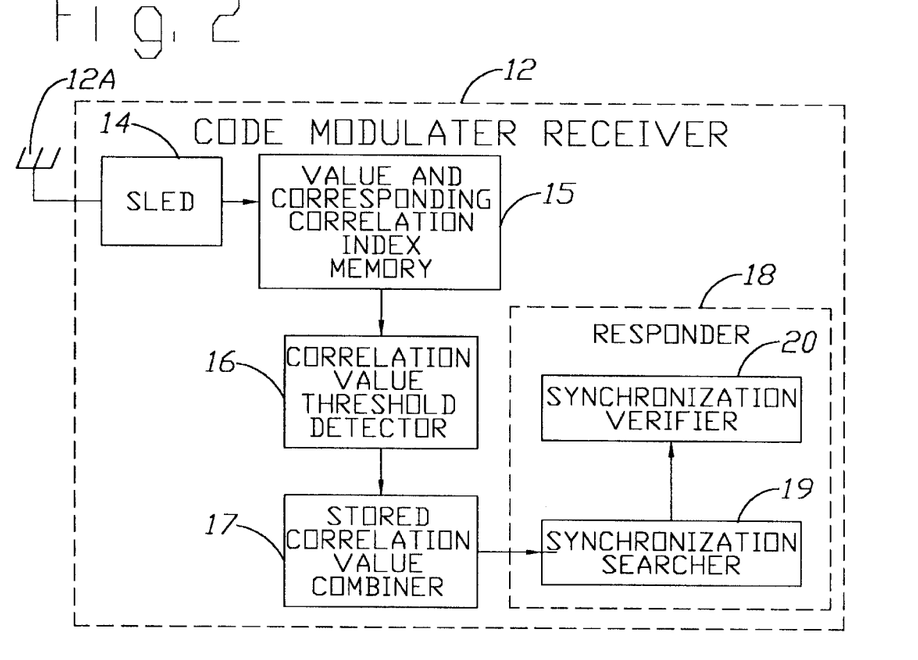
FIG. 2 is a functional block diagram of the code modulated receiver shown in FIG. 1.

Referring to FIG. 2, the output of antenna 11A produces the input signal at antenna 12A to an I-Q square law envelope detector (SLED) 14. The output of the SLED 14 is subjected to an acquisition in accordance with the invention in order to achieve synchronization of the code of the transmitted signal 13 with a local code loaded in the SLED 14. As shown in FIG. 2, the output of the SLED 14 is connected to a correlation value and corresponding index memory 15 which receives the correlation indexes outputted by the SLED 14. The outputted indexes are received by a correlation value threshold detector 16 which selects correlation values exceeding a preselected threshold. Indexes having correlation values exceeding the threshold are passed to a stored correlation value combiner 17. Indexes selected by the correlation value threshold detector 16 and the stored correlation value combiner 17 are used by a responder 18 in a synchronization searcher 19 and a synchronization verifier 20 to synchronize the PN spreading code of the transmitted signal 13 with a local code loaded in the SLED 14.

The SLED 14, as shown in FIG. 3, includes a signal duplicator 21, multipliers 22 and 23, low pass filters 24 and 25, samplers 26 and 27, two substantially identical sliding correlators 28 and 30, squarers 32 and 34, and a summer 36.

Figure 4:
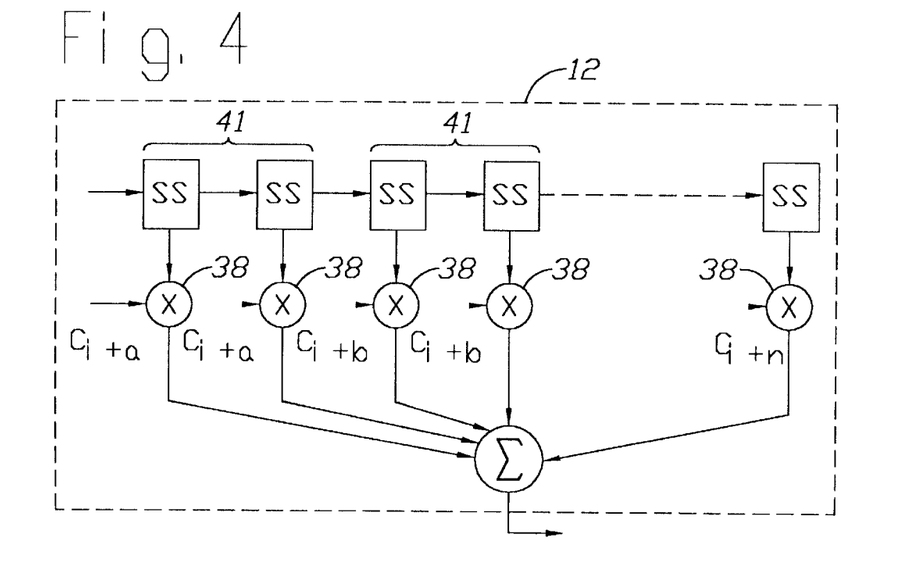
FIG. 4 is a functional block diagram of the correlator in the SLED shown in FIG. 3.

Referring to FIG. 3, the transmitted signal 13 is received by the SLED 14 and at the duplicator 21 the transmitted signal 13 is duplicated and transmitted along parallel paths of the SLED 14 and through the respective multipliers 22 and 23 and the low pass filters 24 and 25. The transmitted signal 13 enters samplers 26 and 27 where the transmitted signal 13 is sampled preferably at the sample rate of two or more samples/chip. A detailed view of sliding correlator 28, which is also representative of the sliding correlator 30 is shown in FIG. 4. For purposes of this discussion, two samples per chip or signal samples (SS) 41 are provided by the samplers 26 and 27. Each of the sliding correlators 28 and 30 are loaded at 38 with fixed local code chips $c_{i+N}$, which is a replica of a section of the transmitted PN spreading code of the transmitted signal 13 having a code period of N chips. The signal samples 41 are then slid across the sliding correlators 28 and 30, and the output of the correlators 28 and 30 is squared by respective squarers 32 and 34. The summer 36 then sums the output from the squarers 32 and 34.

Figure 5:
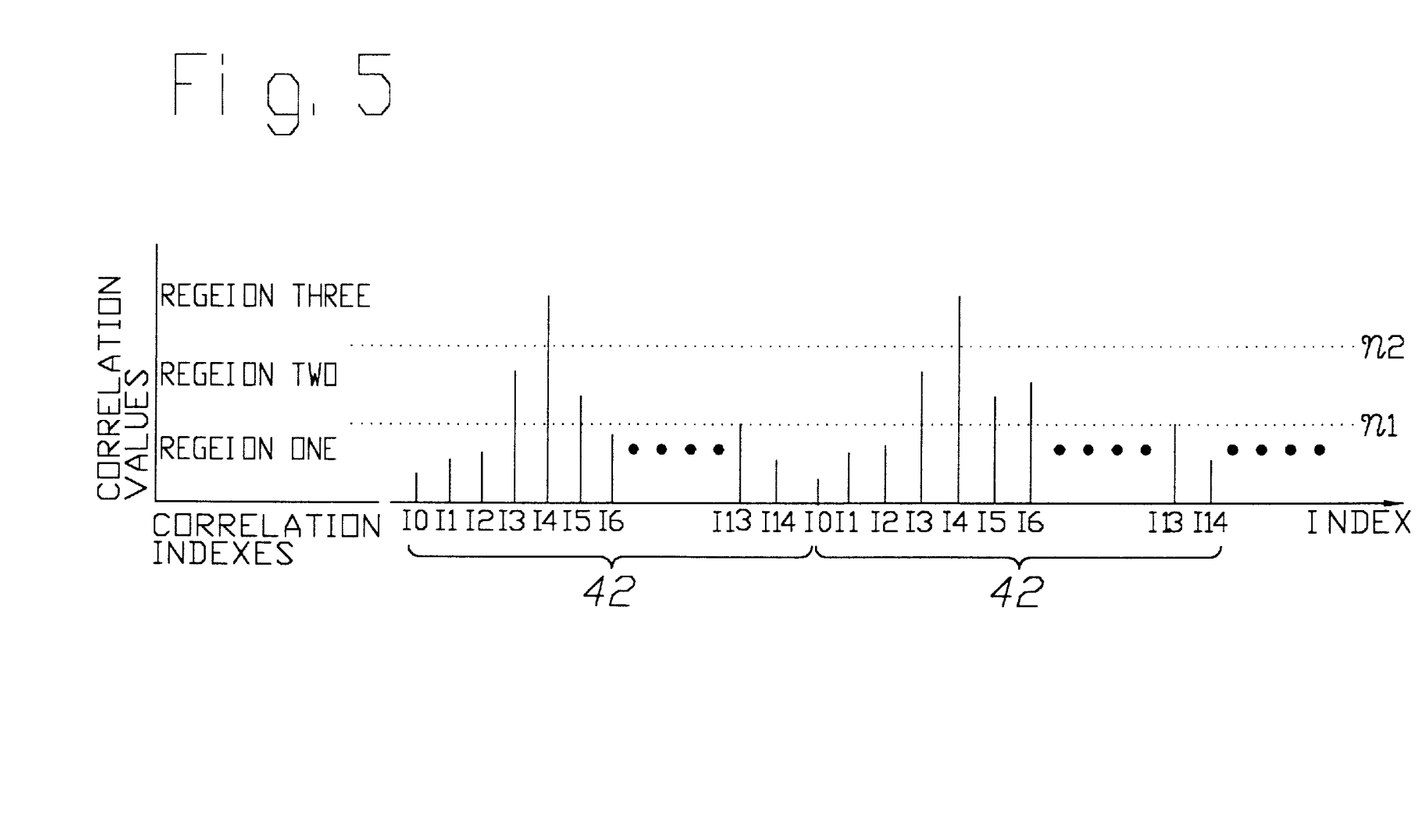
FIG. 5 is an illustration of an output of the SLED obtained from the receiver of FIG. 2.

The output of the SLED 14 is shown in FIG. 5 as output samples 42 having correlation values with associated indexes represented as $R^j(i)$, where the index $0 \leq i \leq 2N-1$ is counted Modulo (2N). The superscript j corresponds to the code periods tested in the search mode. The superscript j is initialized to 1 when the search mode is entered the first time or re-entered after failure in the verification mode. Thereafter, j is incremented by 1 each time 2N samples are outputted from the SLED 14. Hence, j corresponds to the number of received code periods tested in the search mode. In the illustration of FIG. 5, N=7.

In another embodiment in accordance with the invention, instead of continuously sliding the signal samples 41 across the fixed local code chips $c_{i+N}$, signal samples 41 of the transmitted signal 13 are captured and stored in the sliding correlators 28 and 30, and $R^j(i)$ is obtained by sliding the local PN code chips $c_{i+N}$, across the stored signal samples 41 for the complete period. To test a new period, the local code chips for a complete period are again slid across the signal samples 41.

Referring to FIG. 5 the correlation values of the indexes of the output samples 42 experience a peak value when the received signal samples 41 match with a code loaded in a section 38. When there is no match, the indexes of the output samples 42 represented as $R^j(i)$ have a relatively small value. When noiseless received signal samples 41 run continuously through the SLED 14, the output samples 42 are periodic with period 2N. The peak value occurs every 2N sample with the same index, such as indexes 3, 4, and 5 shown in FIG. 4.

In the search mode, the output samples 42 and correlation values for associated indexes are stored for consecutive search periods. The output samples 42 whose indexes have a consistently high correlation value are combined. In the verification mode, multiple verifications are used to improve the probability of detecting the correct or synchronized index.

As shown in FIG. 5, the output sample 42 of the SLED 14 are compared to two search thresholds $\eta_1$, and $\eta_2$, where $\eta_1 \leq \eta_2$. A correlation value of each index of an output sample 42 falls in one of 3 regions as shown in FIG. 5. Peak correlation values for the indexes I3, I4, and I5 indicate a likely match and synchronization of the received signal samples 41 with the loaded section of the code $c_{i+N}$. However, where correlation values of indexes are not consistently high, the possible presence of noise or fade phenomenon requires that the results be confirmed before concluding that an index is successful or indicating a synchronization of the transmitted signal 13 and the local code. As an illustration of this condition, the correlation values of index 16 of the output samples 42 in FIG. 5 and its correlation value is not consistent because its value is in Region One in one of the output samples 42 and in Region Two in the second output sample 42.

TABLE I

| | |
|---|---|
| Region One | $R^j(i) < \eta_1$ |
| Region Two | $\eta_1 \leq R^j(i) < \eta_2$ |
| Region Three | $R^j(i) \geq \eta_2$ |

Prior to commencing the search mode of an acquisition process in accordance with the invention, three integers $H_1 \geq 1, H_2 \geq H_1$ and $M \geq 0$ are selected having values depending on available memory.

Figure 6A:
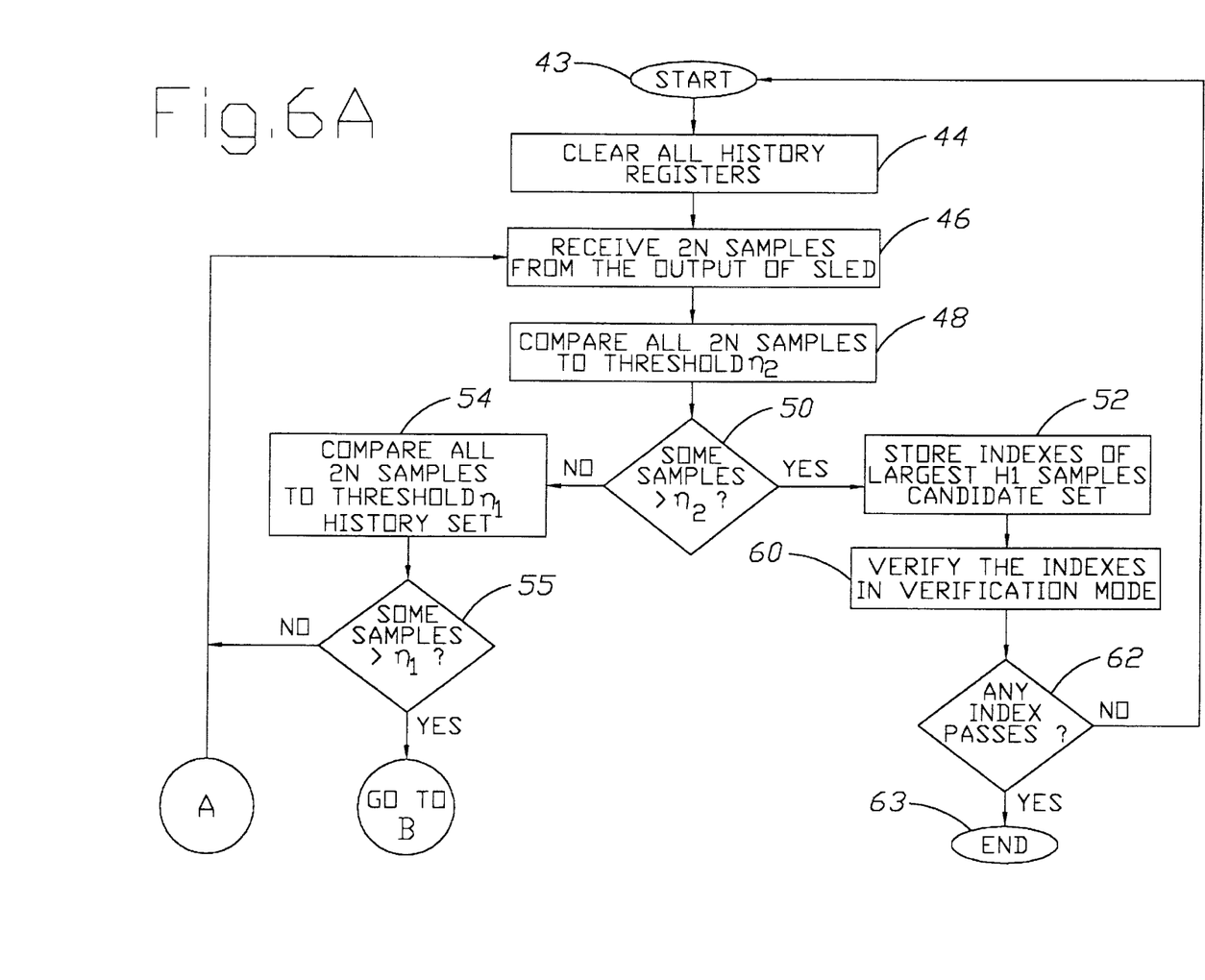
FIG. 6(a) and FIG. 6(b) shows a flow chart of the search mode in the code modulated communication system shown in FIG. 4.
Figure 6B:
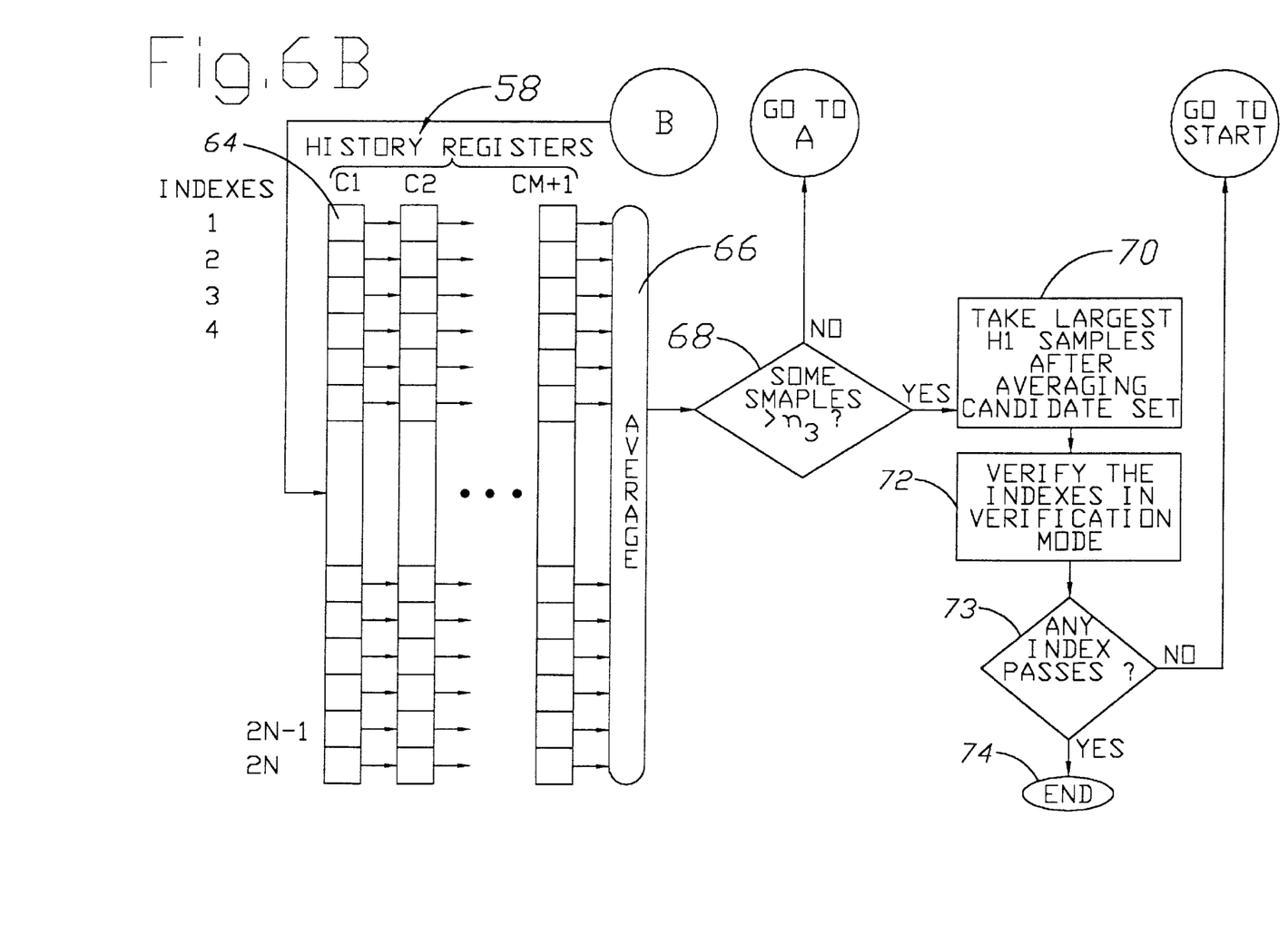

Referring to the flow chart in FIGS. 6a and 6b, the search mode is performed as follows:

As shown in FIG. 6A, the search mode begins at step 43, and at step 44 all history registers 58 shown in FIG. 6b are cleared. At step 46, 2N output samples 42 are outputted from the SLED14 are received. The output samples 42 are identified as $R^j(i)$, where i=0,1,2, ... 2N-1 and j is initially set at 1; thereafter, j is initialized to 1 each time step 44 is re-started. The output samples 42 are compared to threshold $\eta_2$ at step 48. Preferably the 2N output samples 42 are compared to $\eta_2$ as they are produced, i.e., without having to wait for all 2N output samples before starting to make the comparisons. At step 50, the largest H1 output samples 42 having a correlation value greater than $\eta_2$ and within Region Three, and their corresponding indexes are stored in step 52 and denoted as the candidate set. If no output samples are greater than $\eta_2$ and the candidate set is empty, at step 54 all output samples 42 are compared to $\eta_1$. At step 55, all $H_2$ samples having a correlation value greater than $\eta_1$ and less than $\eta_2$ and their corresponding indexes within Region Two are stored at the corresponding index location in the history register 58 in FIG. 6B as the history set in column C1. Previous history sets are shifted to the next sequential history register column C2 through column CM+1. If no output samples 42 have a correlation value greater than $\eta_1$ then the process returns to step 46.

If the candidate set at step 52 is not empty, at step 60 the verification mode is entered as described below, with the available indexes in the candidate set stored at step 52. At step 62 if any index passes the verification mode the process ends at step 63, and if verification mode fails all sets are cleared and the process restarts from step 44 above. If the candidate set at step 52 is empty, while the history set at step 54 is not, step 64 below is entered. If both sets are empty step 46 is restarted.

At step 64, without clearing the previous M history sets, the new history set is stored at column C1 which includes the largest $H_2$ of output samples 42 stored if they fall within Region Two. Previous history sets are then shifted to the next sequential column C2 through CM+1. Hence, there exists one new and at most M old history sets at columns 1 and M+1, respectively.

After a number of code periods are received each of the CM+1 sets will include a number of sample values. Set j includes samples $R^j(i)$ with different indexes i. Since each value of i corresponds to a particular relative delay between the received signal 13 and the local code, if the same value of i exists in all CM+1 sets, then potentially this i corresponds to synchronization between the local and received codes. At step 66, the samples whose indexes exist in all history, that is, if there are CM+1 samples with the same index in all registers, the sets are averaged (sample values are added and divided by M+1) at step 68 the samples are compared to a third search threshold $\eta_3$, which is expressed as $\eta_1 \leq \eta_3 < \eta_2$. The indexes corresponding to the largest $H_1$ averaged samples>$\eta_3$, at step 70 are recorded in the candidate set, and the verification mode is entered at step 72 with these indexes. At step 73, if verification mode passes the process ends at step 74, and if indexes fail, then all sets are cleared and the search mode restarts from step 44 above.

At step 70, if the candidate set is empty, step 46 is reentered.

During the verification mode of an acquisition process in accordance with the invention, multiple verifications are performed, as opposed to the existing conventional single verification procedure. The verification mode is entered with at most $H_1$ indexes to be verified. If the verification system is equipped with $H_1$ correlators, then $H_1$ verifications are preferably performed simultaneously in parallel. If less than $H_1$ correlators are available, the verification mode is performed sequentially using the available correlators until all indexes in the candidate set are tested.

Figure 7:
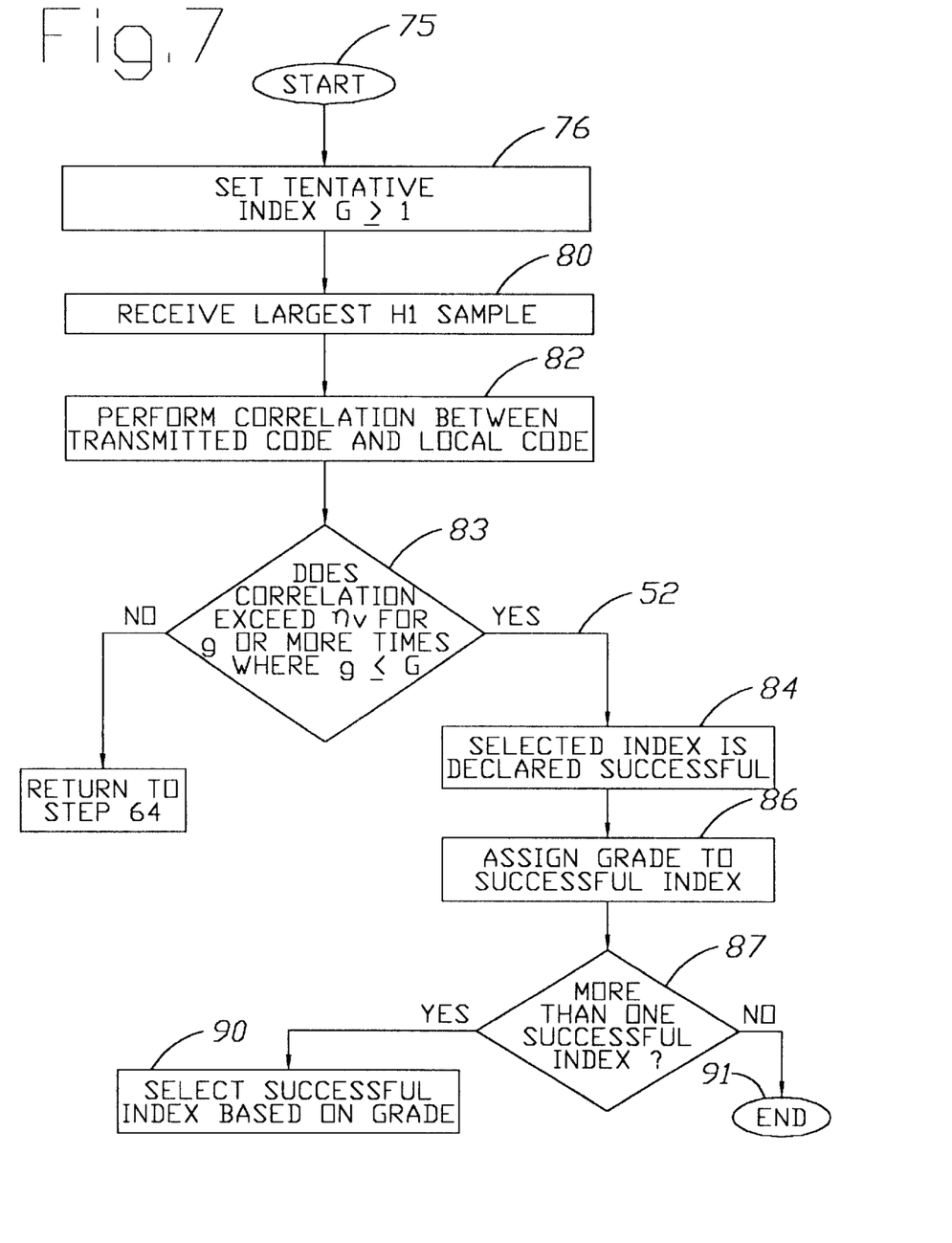
FIG. 7 is a flow chart of the verification mode of the code modulated communication system in accordance with the invention.

Referring to FIG. 7, the verification mode begins at step 75. At step 76 a tentative index is set. At step 80, the indexes corresponding to the largest H1 samples found at step 60 or 72 are received, and at step 82, using the tentative index, $G \geq 1$, recorrelations are performed between the local and received codes for each index i. The correlators are preferably performed using an I-Q square law envelope detector such as the SLED 14 disclosed herein. The correlator is tested at step 83 and if none of the indexes in the candidate set is successful, then the candidate set is cleared, and at step 83, the process returns to step 44 of the search mode, and if the results exceed a threshold $\eta_v$ for g or more times ($g \leq G$), then the selected index is declared successful at step 84. Thus, the transmitted signal 13 is synchronized with the local code. A successful index is given a grade, at step 86. Preferably, this grade is the number of times the threshold $\eta_v$ is exceeded. Alternatively, the grade is the average of the squared correlations of the G verification correlations.

At step 87, if one or more indexes are successful, at least one index is selected to correspond to a correct alignment at step 90. In multipath fading channels, where each alignment correspond one channel path, more than one indexes are selected. The grade given to each successful index is used in selection. If only one index is successful, then the verification mode ends at step 91.

In another embodiment of the invention, the two search mode thresholds $\eta_1$, and $\eta_2$ are set to zero. Alternatively, only $\eta_1$ is set to zero. In these embodiments, the acquisition proceeds the same as described above with reference to FIGS. 1 through 7.

In yet another embodiment, a majority vote element is implemented in the search mode. The samples whose indexes exist more times in the old and new history sets are averaged and compared to $\eta_3$. The indexes corresponding to the largest $H_1$ averaged samples>$\eta_3$ are recorded in the candidate set and the verification mode is entered with these indexes.

In another embodiment, only $\eta_1$ is set to zero while $\eta_2$ is retained. While setting $H_2=2N$, i.e.; the history set includes all SLED 14 output samples 42 and associated indexes. In this case, the integer M is set to zero, i.e., there is one history register in 64, and the averaging process mentioned at step 66 of the search mode is implemented by building a histogram for each index of the SLED 14 output samples 42. By building a histogram, each index i has an old sample stored in the history register and a new sample coming from step 55.

If the old sample is designated as $R_{old}$, and the new sample is designated as $R_{new}$, each index i of the old sample is updated as:

$$R_{old} = \alpha R_{old} + (1-\alpha) R_{new},$$

where $\alpha$ is a positive fraction less than zero, i.e., $0 < \alpha < 1$.

After each PN code period is tested the histogram values are compared to $\eta_3$ to determine the candidate set.

Those skilled in the art who now have the benefit of the present disclosure will appreciate that the present invention may take many forms and embodiments. Although the invention is described in a wireless PN code application, the invention is applicable to other code modulated systems including wired communication systems. Some embodiments have been presented so as to give an understanding of the invention. It is intended that these embodiments should be illustrative, and not limiting of the present invention. Rather, it is intended that the invention cover all modifications, equivalents and alternative falling within the spirit and scope of the invention as defined by the appended claims.

What is claimed is:

1. A system for synchronizing acquisition of a transmitted signal with a local code in a code modulated communication system having a transmitted signal and a local code which is a replica of the code of the transmitted signal, comprising;

a correlator for producing a correlation index reproducing a correlation index representative of the extent of correlation during each one of a plurality of search periods;

a history register memory with a plurality of registers for a current set of correlation indexes and a plurality of registers for a previous set of correlation indexes for storing the correlation indexes produced during each of the plurality of successive search periods;

a stored correlation index combiner for combining the stored correlation indexes from the history register memory which exceed a preselected threshold; and a responder for responding to the combined indexes to achieve synchronization between the transmitted signal and the local code.

2. The system as recited in claim 1 wherein the correlation memory comprises:

means for observing correlation indexes produced during the plurality of search periods to have correlation values that fall within a predetermined range of values; and an index memory for storing a preselected number of indexes observed to have correlation values which are within the predetermined range.

3. The system as recited in claim 2 wherein the monitoring means determines which of the indexes have correlation values that fall within each of a plurality of ones of a plurality of ranges; and the index memory has different storage locations at which the indexes of different correlation value ranges are stored, respectively.

4. The system as recited in claim 3 wherein the plurality of ranges comprises:

a first range defined by values between a first threshold and second threshold, said second threshold being larger than said first threshold; and a second range defined by values which exceed the second threshold.

5. The system as recited in claim 4 comprising a verification correlator for correlating indexes within one of said plurality of ranges with a verification threshold.

6. A method for synchronizing acquisition of a transmitted signal with a local code in a code modulated communication system in which the local code is a replica of the code of the transmitted signal, comprising the steps of:

producing a correlation index representative of the extent of correlation during each one of a plurality of search periods;

storing the correlation indexes produced during each of the plurality of successive search periods in a history register memory with a plurality of registers for a current set of correlation indexes and a plurality of registers for a previous set of correlation indexes;

combining via a stored correlation index combiner the stored correlation indexes from the history register memory which exceed a preselected threshold; and responding the combined indexes to achieve synchronization between the transmitted signal and the local code.

7. The method as recited in claim 6 wherein the step of storing the correlation indexes comprises the steps of:

observing correlation values produced during the plurality search periods;

selectively storing a preselected number of indexes observed to have values which are within a predetermined range.

8. The method as recited in claim 7 wherein the step of selectively storing comprises the steps of:

establishing a plurality of ranges; and storing indexes observed to have values which are within different ones of said plurality of ranges at different storage locations.

9. The method as recited in claim 8 wherein the step of establishing a plurality of ranges comprises the steps of:

defining a first ranged as values between a first threshold and second threshold, the second threshold being larger than said first threshold; and defining a second range as values which exceed the second threshold.

10. The method as recited in claim 8 comprising the step of correlating indexes which are within said plurality of ranges with a verification threshold.

11. A method of acquisition for acquiring synchronizing of a received transmitted signal with a local signal in a modulated communication system, the method comprising the steps of:

correlating first outputted samples of the received signal and the local signal;

establishing a first search threshold;

comparing the correlated first outputted samples to the first search threshold;

storing a selected number of samples first correlated that exceed the first threshold in a first history register memory;

establishing a verification threshold;

recorrelating the samples stored in the first history register memory;

comparing the recorrelated samples in the first history register memory to the verification threshold; and establishing synchronization for the recorrelated stored samples corresponding to the first outputted samples which exceed the verification threshold a selected number of times.

12. The method as recited in claim 11 comprising the steps of:

establishing a second search threshold having a value less than the first search threshold;

comparing the first outputted samples to the second search threshold if no first outputted samples exceed the first search threshold and the first history register memory is empty;

storing selected first outputted samples having a value greater than the second search threshold and less than the first search threshold in a second history register memory; and repeating the steps of claim 11 if the first history register memory and the second history register memory are empty.

13. The method of claim 12 wherein each outputted samples comprise a preselected number of sequential indexes.

14. The method of claim 12 wherein the second history register memory includes a plurality of sequential storage registers with each register having a storage location for each index of the sequential index or for each sample with each index having a corresponding location in every register.

15. The method of claim 14 including the steps of:

adding the stored samples stored in the second history register memory in a sequential manner; and deleting an oldest stored sample in the second history register memory when storing a sample in the second history register memory.

16. The method of claim 15 comprising the steps of:
- identifying in the samples stored in the second history register memory corresponding indexes in the plurality of registers having a same value; and
- determining an average value by adding the values of the corresponding indexes and dividing by the number of the plurality of registers.

17. The method of claim 16 including the step of comparing the average value to a third search threshold.

18. The method of claim 17 wherein the third threshold is less than the first search threshold and greater than the second search threshold.

19. The method of claim 18 including the steps of:
- recorrelating the samples stored in the second history register memory;
- performing verification for the recorrelated samples stored in the second history register memory exceeding the third threshold; and
- establishing synchronization for the recorrelated samples stored in the second history register memory that exceed the verification threshold a selected number of times.

20. A system of acquisition for acquiring synchronizing of a received transmitted signal with a local signal in a modulated communication system, comprising:
- means for correlating first outputted samples of the received signal and the local signal;
- means for establishing a first search threshold;
- means for comparing the correlated first outputted samples to the first search threshold; and
- means for storing a selected number of samples first correlated that exceed the first threshold in a first history register memory.

21. The system recited in claim 20 comprising:
- means for establishing a verification threshold;
- means for recorrelating the samples stored in the first memory;
- means for comparing the recorrelated samples in the first history register memory to the verification threshold; and
- means for establishing synchronization for the recorrelated stored samples recorrelated corresponding to the first outputted samples which exceed the verification threshold a selected number of times.

22. The method as recited in claim 21 comprising the steps of:
- means for establishing a second search threshold having a value less than the first search threshold;
- means for comparing the first outputted samples to the second search threshold if no first outputted samples exceed the first search threshold and the first history register memory is empty; and
- means for storing selected first outputted samples having a value greater than the second search threshold and less than the first search threshold in a second history register memory.

23. The system of claim 22 wherein each outputted samples comprise a preselected number of sequential indexes.

24. The system of claim 22 wherein the second history register memory includes a plurality of sequential storage registers with each register having a storage location for each index of the sequential index or for each sample with each index having a corresponding location in every register.

25. The system of claim 24 comprising:
- means for adding the stored samples stored in the second history register memory in a sequential manner; and
- means for deleting an oldest stored sample in the second history register memory when storing a sample in the second history register memory.

26. The system of claim 25 comprising:
- means for identifying in the samples stored in the second history register memory corresponding indexes in the plurality of registers having a same value; and
- means for determining an average value by adding the values of the corresponding indexes and dividing by the number of the plurality of registers.

27. The system of claim 26 comprising means for comparing the average value to a third search threshold.

28. The system of claim 27 wherein the third threshold is less than the first search threshold and greater than the second search threshold.

29. The system of claim 28 comprising:
- means for recorrelating the samples stored in the second history register memory,
- means for performing verification for the recorrelated samples stored in the second history register memory exceeding the third threshold, and
- means for establishing synchronization for the recorrelated samples stored in the second history register memory that exceed the verification threshold a selected number of times.

* * * * *